Oct. 24, 1950          G. N. SMITH          2,527,106
DEPTH OF FIELD INDICATOR
Filed June 16, 1947          4 Sheets-Sheet 1
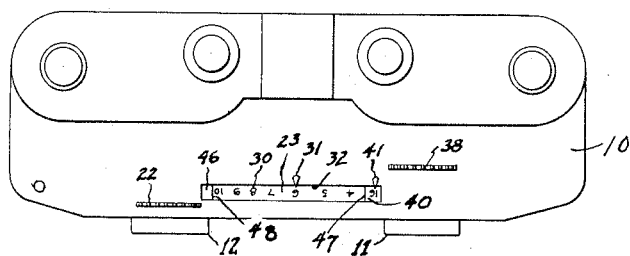
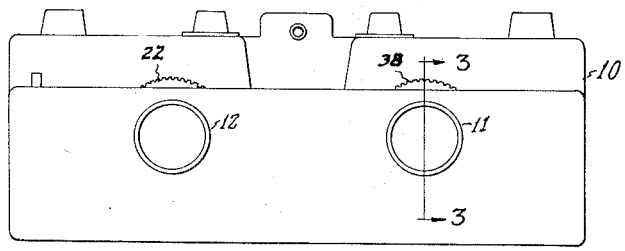
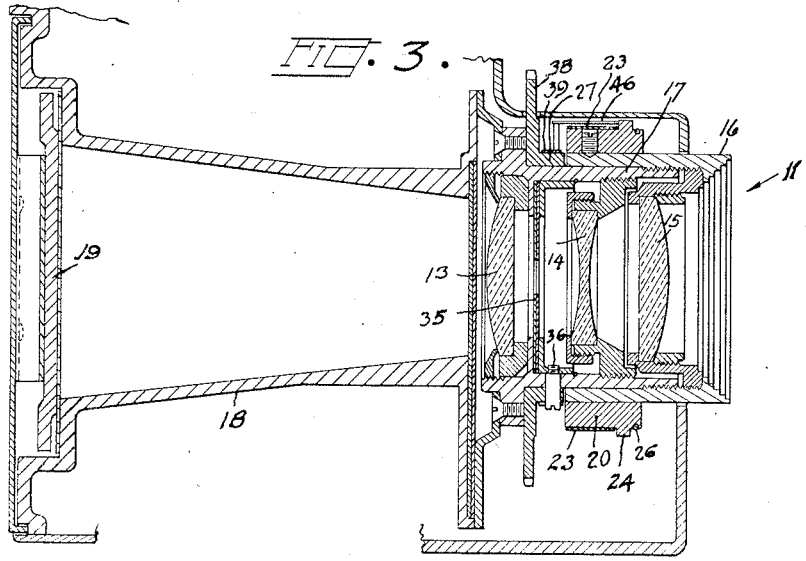
INVENTOR
GORDON N. SMITH.
BY
ATTORNEY Oct. 24, 1950          G. N. SMITH          2,527,106
DEPTH OF FIELD INDICATOR
Filed June 16, 1947          4 Sheets-Sheet 2
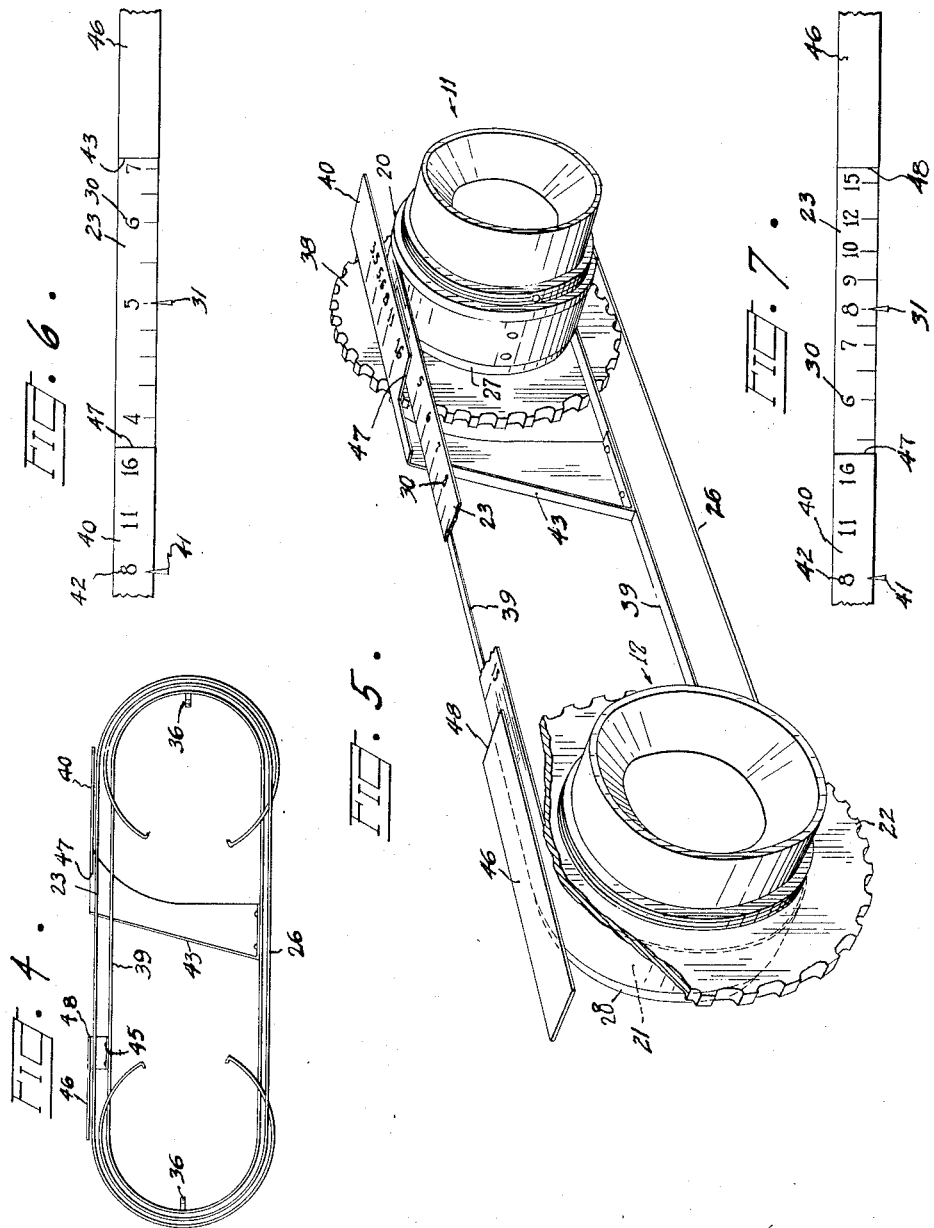
INVENTOR
GORDON N. SMITH
BY
ATTORNEY Oct. 24, 1950  G. N. SMITH  2,527,106
DEPTH OF FIELD INDICATOR Filed June 16, 1947  4 Sheets-Sheet 3

INVENTOR
GORDON N. SMITH
BY
ATTORNEY

Oct. 24, 1950 G. N. SMITH 2,527,106
DEPTH OF FIELD INDICATOR
Filed June 16, 1947 4 Sheets-Sheet 4

INVENTOR
GORDON N. SMITH
BY
ATTORNEY

Patented Oct. 24, 1950

2,527,106

UNITED STATES PATENT OFFICE 2,527,106

DEPTH OF FIELD INDICATOR

Gordon N. Smith, Portland, Oreg., assignor to Stereocraft Engineering Co., Portland, Oreg., a partnership Application June 16, 1947, Serial No. 754,962

14 Claims. (Cl. 95—18)

My present invention relates to the art of photography, the invention having particular reference to mechanism for indicating the depth of field of the photograph which will be taken by the camera at certain settings of the lenses and diaphragm.

It is an object of the present invention to provide a conventional camera with means to indicate the depth of field, or the distance to the nearest and farthest objects which will appear in acceptable focus in the picture.

The present invention is also of utility in the art of stereophotography, or the taking of three dimensional pictures. Such pictures are accomplished by simultaneously taking two photographs with a pair of spaced camera devices corresponding to the eyes of the observer. Thus each of the pair of photographs is taken at a slight angle to the other so that when the pair of photographs are mounted in a stereoscopic viewer an illusion of depth is created. This illusion or sense of depth is accomplished by presenting a pair of pictures, each corresponding to the view normally seen by each eye alone. It is still necessary in photographing certain objects to ascertain the depth of field for the given setting of the camera. In some cases it is desired to have clear definition of the image throughout its extent so that it is necessary to know how close the nearest point of the object can be placed to the camera lens and how far the depth of field extends so as to include the farthest point of the object in sharp detail.

An amateur photographer is likely to misjudge the depth of field of the lenses of his camera under various conditions of lighting and picture composition without the use of some type of depth of field indicator. Such indicators are known to the art but they comprise charts, tables or shiftable index-bearing members of the rotary slide rule type or the like, showing in tabular form such items as depth of field versus focus versus diaphragm scales with multiple fixed indices corresponding to certain diaphragm openings, or independently adjustable scales of focus versus diaphragm opening with multiple fixed indices corresponding to certain diaphragm openings. Each of these prior art devices is a separate article, or comprises a portion of a pamphlet or booklet separate from the camera, and likely to be missing when most needed, and even when present requires certain skill on the part of the photographer. In order to use them effectively he must know the art of photography fairly well and must concentrate on a number of variable factors in order to achieve a proper camera setting. In the event that these prior art devices are attached to or built into the camera they complicate the construction and increase its cost by requiring additional assemblies not otherwise useful to the camera functions.

The depth of field indicator of my present invention is an integral part for the camera construction, is automatically operated upon operation of the two conventional adjustments required in all focusing cameras (i. e. focus adjustment and diaphragm adjustment), and indicates to the operator the depth of field for any given adjustment of the two conventional adjusting means. The present invention indicates immediately and accurately the field between the closest point and the farthest point which will appear in acceptable focus for any given setting of the camera.

An object of the present invention is to provide coupling means for connecting the lenses of a stereoscopic camera for simultaneously and coextensively adjusting the focus of the two lens assemblies and for coupling the diaphragms of the two lens assemblies for adjusting the stop setting thereof simultaneously and coextensively, without lost motion or backlash.

A further object of the present invention is to provide a differential mechanism which will automatically define the limits of the scene in acceptable focus upon any adjustment of the focus of the lenses of a stereoscopic camera, or the lens of an ordinary camera, and upon adjustment of the diaphragm or diaphragms provided in the camera.

A further object of the present invention is to provide a stereoscopic camera with focus, diaphragm and depth of field scales lying in a normal horizontal plane and visible to the operator when he is in the act of taking a picture.

A further object of the present invention is to provide any type of camera with visible scales indicating focus, diaphragm and depth of field settings of the camera.

A further object of the present invention is to provide any type of camera with scales adapted to overlie each other so as to occupy a limited space. In furtherance of this object of the invention it is a feature of the present invention that the adjustment achieving means and the scales or indicators operated thereby are so constructed and arranged as to occupy a minimum of space.

A further object of the present invention is to provide focus, diaphragm and depth of field scales positioned symmetrically in or on any type of camera.

The objects and advantages of the present invention will be more readily understood by reference to the accompanying drawings taken in connection with the following specification, wherein like numerals refer to like parts throughout.

In the drawings Fig. 1 is a plan view of a stereoscopic camera incorporating the present invention;

Fig. 2 is a front elevation of the camera shown in Fig. 1;

Fig. 3 is a vertical section, with parts broken away, taken along the line 3—3 of Fig. 2;

Fig. 4 is a skeleton view of certain parts of the camera illustrated in the preceding views, this view being directed to the scales and the tapes for operating the scales and accomplishing simultaneous adjustment of the two sets of lens mechanisms in a stereoscopic camera;

Fig. 5 is a perspective view with parts broken away showing the means connecting the two sets of picture-taking apparatus and the scales associated therewith;

Fig. 6 is a fragmentary view showing an example of a setting of a stereoscopic camera such as set forth in the preceding views;

Fig. 7 is a view similar to Fig. 6 illustrating a different setting of the camera;

Figure 8:
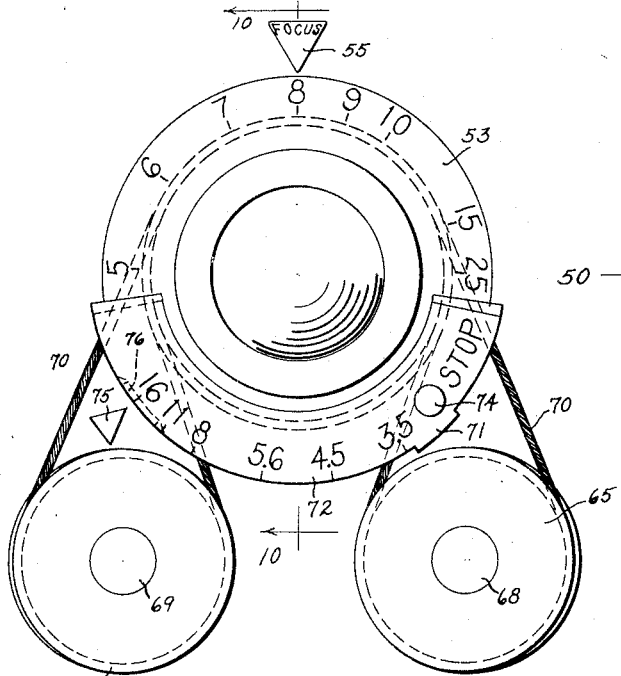
Fig. 8 is a partial, schematic, front elevation of an ordinary camera having the present invention incorporated therein and having a differential scale operating mechanism somewhat similar to that previously illustrated.
Figure 9:
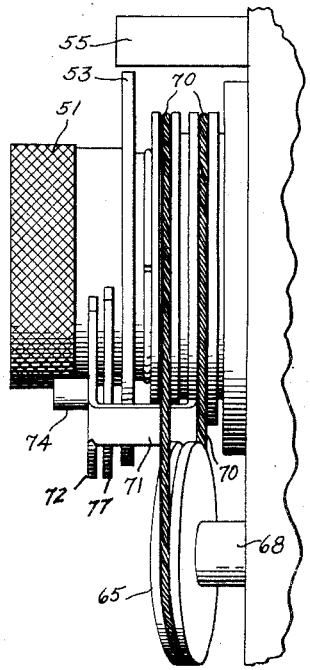
Fig. 9 is a side elevation of the mechanism illustrated in Fig. 8.
Figure 10:
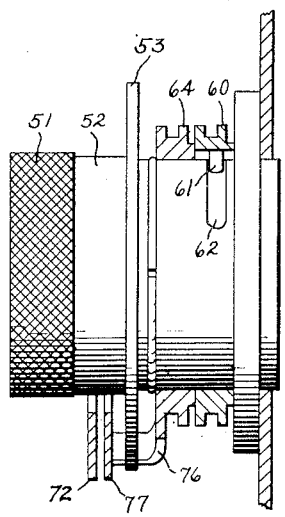
Fig. 10 is a vertical section taken substantially along the line 10—10 in Fig. 8.

Referring to Figs. 1 to 7 inclusive, there is disclosed a stereoscopic camera comprising a case 10 within which are incorporated means for taking a pair of simultaneous photographs including the lens assemblies 11 and 12. The lens assemblies may be any conventional type such as in Fig. 3, comprising a rear fixed lens 13, a central fixed lens 14 and a forward movable lens 15. The fixed lenses are mounted in members screwed into the interior of a fixed lens barrel 17. The forward lens 14 is screwed into the interior of a telescoping lens barrel 16 which is adapted to be moved toward and away from the rear lens by rotation thereof, the barrels 16 and 17 being screw-threaded so that rotation of barrel 16 causes axial movement thereof. By so adjusting the lens assembly the focus of the camera is adjusted, which will affect the photograph which will be taken on the film mounted within the camera at the end of the light tunnel 18. The film as herein illustrated is of the conventional roll type and is adapted to be maintained at a fixed distance from the lens assembly by a pressure pad 19 adapted to hold the film in proper position at the end of the light tunnel. The camera is provided with the usual film strip winding means for unrolling the film from a cartridge (not shown), but it is to be appreciated that the present invention may be incorporated in any type of camera, such as a film pack camera or plate camera.

It is to be appreciated that in the stereoscopic camera herein illustrated there are two sets of lens assemblies 11 and 12, the one being substantially identical with the other. In order simultaneously to adjust the lens assemblies in unison and to the same extent, I provide coupling means comprising the following:

The lens assembly 12 is provided with a sheave 21 which is fixed to the telescoping barrel 16 by screws or the like. The lens assembly 11 is provided with a sheave 20 which is fixed to its telescoping barrel 16 by screws as illustrated in Fig. 3. The sheaves 20 and 21 are identical except that sheave 21 is provided with a lens adjustment wheel 22 intermediate its forward and rearward extremity which projects upwardly through a slot in the upper surface of the camera 10 and is provided with a milled edge so that the operator may twirl the wheel 22 to effect adjustment of the lens barrel 16 attached thereto. In order that such adjustment shall be accompanied by simultaneous and coextensive adjustment of the lens assembly 11, I provide inter-connecting means comprising a steel ribbon 23 having its right end affixed to the surface of the sheave 20 by rivets or the like. The ribbon 23 passes about the sheave 21 at the rear of the disc 22, and about sheave 20 at the rear of an annular ridge 24 on the barrel 16 of assembly 11. Forwardly of the disc 22 and the ridge 24 the sheaves are provided with annular grooves in which are received portions of a cable 26, the cable 26 having its right end fixed to the surface of the sheave 20 and its left end fixed to the surface of the sheave 21. The cable 26 is wrapped around the sheaves in the direction opposite to the wrapping of the ribbon 23 about the sheaves so that the tension of cable 26 opposes the tension of the ribbon 23, and the ribbon and cable move in opposite directions upon rotation of the disc 22.

The ribbon 23 is provided with indicia comprising numerals and lines indicated at 30 and indicative of the focus setting of the lenses, the point on the scale opposite a fixed reference point 31 on the camera indicating the distance to the part of the object which will be in sharpest focus. The indicia 30 on the scale are visible through a window 32 extending laterally between the lens assemblies 11 and 12.

Each lens assembly is provided with a diaphragm mechanism 35 intermediate the rear lens 13 and the central lens 14, which diaphragm assembly may be of any conventional type adjustable from without the lens assembly. In the present disclosure the diaphragm assembly is of the type comprising a plurality of overlapped leaves having arcuate interior edges, which define a central opening of adjustable diameter. In the present disclosure the leaves are connected to a ring mounted within the barrel 15 and adapted to be moved by means of a pin 36 extending through a peripheral slot in the barrel 17, the inner end thereof being attached to the ring and the outer end thereof being attached to a diaphragm adjusting member such as the wheel 38. Each of the diaphragm leaves are connected to the ring through suitable means for translating rotary movement of the ring into such movement of the leaves as to define larger or smaller diameters of the opening through the center of the diaphragm. Such iris or diaphragm mechanisms are well known in the art and further details thereof are not necessary to understand the present invention.

The lens assembly 11 is the only one provided with an adjusting wheel 38, which wheel projects upwardly through a slot in the top wall of the camera, as seen in Fig. 1. The rim of the wheel is milled as illustrated so that digital engagement thereof will be firm. The other lens assembly 12 should be simultaneously and co-extensively adjusted as to its diaphragm opening. For this purpose I provide a steel ribbon 39 which is continuous and passes about a sheave shoulder 27 on the wheel 38 and a corresponding sheave 28 mounted adjacent the diaphragm of the lens assembly 12. The ribbon is prevented from slipping with respect to the lens assemblies by having the pin or screw 36 of each assembly pass therethrough.

In order to indicate the f-stop of the camera a sliding scale 40 is provided, this scale being so mounted as to move past an index pointer 41 at the right end of the window 32. The scale 40 is provided with indicia 42, the indicia appearing opposite the pointer 41 indicating the stop setting of the irises. The scale 40 is mounted upon a bracket 43 which extends upward between the lens assemblies and is attached to the lower reach of the ribbon 39 by screws or the like. The bracket 43 is bent forwardly and the scale 40 extends laterally therefrom so as to overlie the ribbon 23. The left end of the upper reach of the ribbon 39 is provided with a bracket 45 which extends upwardly and is bent forward over the ribbon 23, the extremity thereof extending toward the left end of the camera. The upper surface of the bracket 45 provides a blank shield 46 which is visible at the left end of the window 32. Movement of the diaphragm adjusting wheel 38 is therefore accompanied by differential movement of the scale 40 and the shield 46; the one moving toward the right when the other moves toward the left and vice versa.

Upon opening the diaphragms 35 the distance between the left edge 47 of scale 40 and the right edge 48 of shield 46 is decreased, and upon decreasing the diameter of the openings of the diaphragms the distance therebetween is increased.

*Operation.*—The operation of the apparatus described in the foregoing is as follows: The photographer determines the distance to the portion of the object which he wishes to have in sharpest focus and moves the lens adjustment wheel 22 until that distance appears opposite the pointer 31. He then adjusts the diaphragm adjustment wheel until the f-stop which is suitable or desired appears in the window opposite the pointer 41. Simultaneously with such movement the shield 46 moves to obscure more or less of the tape 23. For example, as seen in Fig. 6, the diaphragm has been adjusted to a stop setting of 8 and the distance to the object in sharpest focus is 5 feet. With these settings the shield 46 and the scale 40 indicate that objects between a minimum distance of 3¾ feet and a maximum distance of 7¼ feet will be in fair focus. If at this distance the operator wishes to increase or decrease the depth of field the diaphragm wheel 38 is adjusted, this causing an increase or decrease in the amount of ribbon 23 visible through the window. Fig. 7 is a further illustration of a camera setting in which the distance to the object desired to be in sharpest focus is 8 feet and the operator has set the f-stop at 8. With these adjustments it is immediately apparent that any object between approximately 5⅓ feet and 17 feet will in fair focus. It is to be appreciated that movable pointers which shift past fixed scales might be substituted for the arrangement herein illustrated.

*First modification.*—In Figs. 8 to 11 inclusive there is illustrated an adaptation of the present invention to a camera for taking two dimensional pictures. Certain details of the camera mechanism are omitted as they will be readily understood to anyone skilled in the art. In these figures there is disclosed a lens assembly 50 which may be similar to that detailed in Fig. 3 but which is provided with a knurled surface 51 which may be grasped and rotated to effect adjustment of the focus of the camera. The knurled surface 51 is provided on the outer telescoping lens member 52 which is provided with an annular scale 53 for indicating the distance to the object in sharpest focus. A pointer 55 may be suitably mounted on any portion of the camera frame adjacent the edge of the scale 53. The rear portion of the lens barrel assembly is provided with a diaphragm adjusting sheave 60 having a pin 61 mounted thereon and extending through a slot 62 into the diaphragm (not shown). Adjacent the sheave 60 and loosely mounted on the barrel of the lens assembly is a sheave 64 of the same effective diameter as the sheave 60. A pair of pulleys 65 and 66 are mounted beneath the lens assembly on divergent shafts 68 and 69 respectively. An endless cable 70 passes about the pulleys 65 and 66 and engages with the upper surfaces of the sheaves 60 and 64. The sheaves are preferably deeply recessed and may be knurled so as to engage the cable without slippage, or the cable reaches may be centrally attached thereto by suitable means.

The sheave 60 is provided with a forwardly extending arm 71 which is bent radially inward at its forward extremity and integrally attached to an arcuate stop scale 72 partially encircling the lens barrel assembly. The forward surface of the scale is provided with f-stop indicia and carries an operating knob 74. Rotation of the knob 74 about the lens assembly causes the indicia to move past an index pointer 75 suitably mounted on the frame of the camera. As seen in Fig. 8 the camera has been set for an f-stop of 16, and in Fig. 11 for an f-stop of 3.5.

Figure 11:
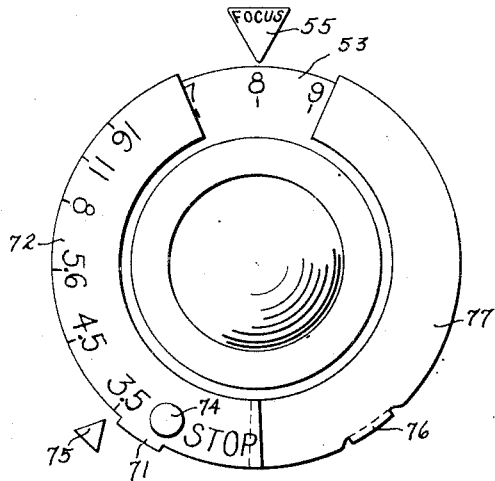
Fig. 11 is a fragmentary view showing the scales at a different setting.

The sheave 64 is provided with an arm 76 which extends forwardly and is integrally attached to an arcuate shield 77. As the scale 72 is rotated the cable 70 causes simultaneous differential rotation of the shield 77. As seen in Fig. 8 the end of the stop scale 72 is adjacent the 4½ foot mark on the focus scale 53 and the end of the shield 77 is adjacent the 30 foot mark of the focus scale 53, thus indicating that for the particular adjustment selected any objects between 4½ and approximately 30 feet from the camera will be in fair focus, with the sharpest focus being at a distance of 8 feet. In Fig. 11 the diaphragm opening has been cut down to an f-stop of 3.5, thus causing simultaneous differential movement of the shield 77 and scale 72 so that the camera will now take a picture including any objects between 7 and 9½ feet in fair focus, with the sharpest focus being at 8 feet.

*Second modification.*—Figs. 12 to 15 inclusive disclose a further modification of the present invention in which a camera similar to that discussed with respect to Figs. 8 to 11 is provided with mechanism including a differential gear assembly. In this assembly the lens adjustment may be accomplished by a knurled knob 80 which rotates a scale 81, having focus indicia thereon, past an index pointer 83. The lens barrel assembly is provided with a first gear 85 having forwardly extending vertical teeth, which encircles the lens barrel and is provided with a pin 86 extending through a slot 87 for operation of the conventional iris type diaphragm. In front of and adjacent the gear 85 is a second gear 88 loosely surrounding the barrel assembly and provided with rearwardly facing vertical teeth.

A bracket 90 is provided beneath the lens assembly and supports a vertical pin 91 upon which is loosely mounted a cone shaped pinion 92 having its teeth engaged in the teeth on the gears 85 and 88. Rotation of one gear will therefore be accompanied by simultaneous and opposite rotation of the other gear. The gear 85 has an arm 95 fixed thereto and extending forwardly, to the forward end of which is attached an arcuate stop scale 96 having f-stop indicia and which carries a stop adjustment knob 98. The gear 88 is provided with a forwardly extending arm 100 to which is attached a shield 101 adapted to lie in the space between the scale 96 and the scale 81.

Figure 12:
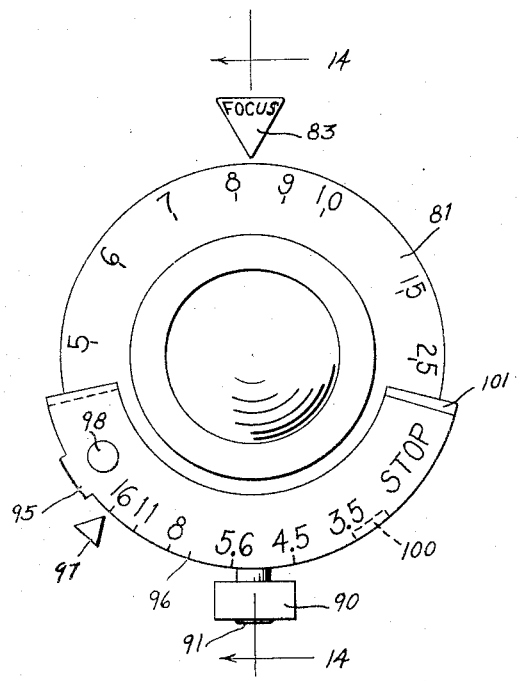
Fig. 12 is a fragmentary view corresponding to Fig. 8 but showing a modified form of differential apparatus.
Figure 13:
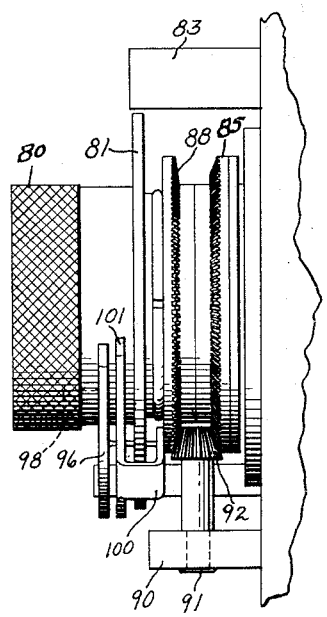
Fig. 13 is a side elevation of the mechanism disclosed in Fig. 12.
Figure 14:
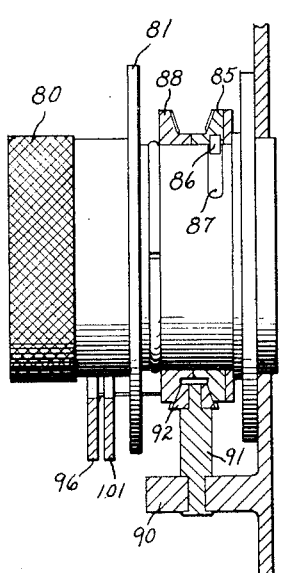
Fig. 14 is a vertical section taken substantially along the line 14—14 of Fig. 12.

In Fig. 12 it is seen that the camera lens has been adjusted for sharpest focus on objects at a distance of 8 feet, and the diaphragm has been adjusted for a 16 f-opening, in which case any object lying between approximately 4½ feet and 30 feet will be in fair focus.

Figure 15:
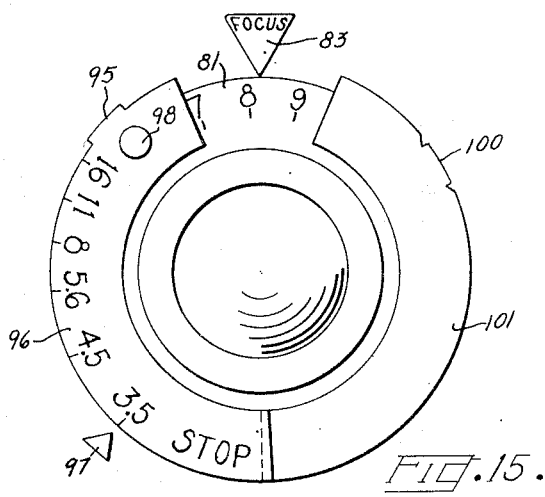
Fig. 15 is a fragmentary view showing a different setting of the apparatus disclosed in Fig. 12.

In Fig. 15 the knob 98 has been rotated until the end of scale 96 is opposite the numeral 7 on scale 81. This movement causes simultaneous coextensive movement, in the opposite direction, of the shield 101, so that its end appears opposite approximately the 9½ foot mark on the scale 81. Thus for this adjustment the sharpest focus will be at 8 feet and any objects lying between 7 and 9½ feet will be in fair focus and the corresponding f-stop is 3.5.

I have herein illustrated and described three modifications which the present invention may assume, and it should be apparent to those skilled in the art that various other modifications of the invention are permissible, such as by modifying details of the parts or the arrangement thereof to suit the taste of design engineers or the requirements of a particular camera. All such modifications in arrangement and detail as come within the true spirit and scope of the following claims are considered to be a part of my invention.

I claim:

1. In a camera the combination of a movable focus scale, a stationary indicator past which said focus scale moves, a stop scale movable across a portion of said focus scale, a second stationary indicator past which said stop scale moves for indicating the diaphragm adjustment of the camera, a shield movable across another portion of said focus scale, and differential means connecting said shield to said stop scale for effecting simultaneous, coextensive and opposed movement of said shield and said stop scale whereby the adjacent ends of said shield and of said stop scale define on said focus scale the limits of the depth of field for the particular focus and stop adjustment.

2. In a stereoscopic camera having a pair of lens assemblies and associated diaphragms, means for adjusting the focus setting of said lens assemblies simultaneously and coextensively, and means for adjusting the diaphragm stop setting of said diaphragms simultaneously and coextensively; the improvement comprising a movable focus scale having indicia thereon and extending horizontally between said lens assemblies, and a movable stop scale superimposed upon said focus scale and having indicia thereon for indicating the diaphragm stop setting, a differential mechanism connected to said stop scale, and a shield superimposed upon said focus scale and movable by said differential mechanism coextensively and simultaneously with, but in the opposite direction from, said diaphragm stop scale, whereby said shield and said diaphragm stop scale bracket indicia on said focus scale defining the depth of field in acceptable focus for the particular adjustment of the lens assemblies and the diaphragms therefor.

3. A camera comprising an adjustable lens barrel assembly including a rotatable portion for effecting focus adjustments and having an iris diaphragm therein, an annular scale fixed to said rotatable portion of the lens barrel assembly for indicating the focus adjustment thereof, a pair of rotatable elements surrounding a fixed portion of said lens barrel assembly, means connecting one of said rotatable elements to said iris diaphragm for adjusting the stop thereof, a differential mechanism connecting said one rotatable element to the other of said rotatable elements for effecting simultaneous and coextensive movement thereof in the direction opposite to the direction of movement of said one rotatable element, an arcuate stop scale fixed to said one rotatable element and movable across a portion of said focus scale, and an arcuate shield fixed to said other rotatable element and lying between said focus scale and said stop scale, said stop scale and said shield being thereby movable to various extents as the diaphragm opening is adjusted with the ends thereof embracing variable portions of said focus scale to indicate the depth of field for the selected focus and stop adjustment.

4. The structure set forth in claim 3 in which said differential mechanism comprises a pair of idler sheaves and a cord extending about said sheaves with each reach of said cord engaging one of said rotatable elements.

5. The structure set forth in claim 3 in which said differential mechanism comprises a pair of equal gears, each connected to one of said rotatable elements, and a pinion interposed between and engaging the teeth of both of said gears.

6. In a stereoscopic camera comprising a pair of lens barrel assemblies including focus adjusting barrel portions and diaphragm adjusting barrel portions, the improvement comprising a focus scale band wrapped about the upper surfaces of said focus adjusting barrel portions and fixed thereto at its ends whereby focus adjustment of one lens barrel assembly causes simultaneous focus adjustment of the other, an endless band extending about said diaphragm adjusting barrel portions whereby stop adjustment of one diaphragm causes simultaneous stop adjustment of the other, a first focus scale obscuring member attached to the upper reach of said endless band and movable across a portion of said focus scale band, and a second focus scale obscuring member attached to the lower reach of said endless band and movable across a spaced portion of said focus scale band.

7. In a camera, the improvement comprising an elongated window in an upper surface of the camera when the camera is held directed toward an objective in picture-taking position, an elongated focus scale visible through said window and movable longitudinally thereof, a stationary indicator disposed centrally of said window and cooperating with said focus scale to indicate focus settings of the camera, a stop scale shield movable across said focus scale from one end of said window toward the center thereof to obscure variable portions of said focus scale at said one end of the window, a second stationary indicator cooperating with said stop scale shield to indicate stop settings of the camera, a second shield movable across said focus scale from the other end of said window toward the center thereof to obscure other variable portions of said focus scale at said other end of the window, and differential means connecting said focus scale shield to said second shield for effecting simultaneous, coextensive and opposed movement of said stop scale shield and said second shield.

8. In a stereoscopic camera comprising a horizontally spaced pair of lens barrel assemblies each comprising a rotatable portion for effecting focus adjustment thereof, and a pair of adjustable diaphragm assemblies associated with said lens barrel assemblies and each including a rotatable adjustment sheave for effecting stop adjustment thereof, the improvement comprising a first flexible element at least partially embracing each rotatable portion of said lens barrel assemblies and having a horizontal reach extending therebetween constituting a focus scale, a second flexible element at least partially embracing each of said sheaves for effecting simultaneous diaphragm adjustments, said second flexible element having a first reach and a return reach extending horizontally between said assemblies and parallel to the horizontal reach of said first flexible element, a stop scale connected to said first reach of said second flexible element and movable thereby to indicate stop settings of the diaphragms, said stop scale obscuring portions of said focus scale and acting as an indicator to indicate a depth of field limit on said focus scale, and a focus scale obscuring shield connected to said return reach and movable thereby across other portions of said focus scale, said shield defining the opposite limit of the depth of field on said focus scale.

9. A camera comprising an adjustable diaphragm, diaphragm adjusting means including a first rotatable sheave connected to said diaphragm for adjusting the stop thereof, a second rotatable sheave horizontally spaced from said first sheave, a movable, focus scale having distance-representing indicia thereon, flexible means extending about and having horizontal, parallel reaches between said rotatable sheaves, a first shield fastened to one reach of said flexible means and extending over a portion of said scale, a second shield fastened to the other reach of said flexible means and extending over a spaced portion of said scale, one of said shields having stop adjustment indicia thereon for indicating the stop setting of the camera, and said shields being movable by said flexible means simultaneously, coextensively and in opposed directions upon adjustment of said diaphragm to indicate on said scale the depth of field of the camera for the selected stop setting.

10. A camera comprising a rotatable, focus-adjusting lens barrel, an iris diaphragm coaxial with said lens barrel, a rotatable sheave horizontally spaced from said lens barrel, a focus scale band extending about the upper surfaces of and secured to said lens barrel and said sheave whereby focus adjustment is indicated by said focus scale band, a second sheave coaxially and rotatably mounted on said lens barrel and connected to said iris diaphragm for effecting stop adjustment thereof, a third rotatable sheave horizontally spaced from said second rotatable sheave, an endless band extending about and between said second and third sheaves and having its reaches parallel to said focus scale band, a first focus scale obscuring member attached to the upper reach of said endless band and movable across a portion of said focus scale band, and a second focus scale obscuring member attached to the lower reach of said endless band and movable across another portion of said focus scale band.

11. A stereoscopic camera comprising a horizontally spaced pair of lens barrel assemblies, each of said lens barrel assemblies including focus adjusting means comprising a rotatable sheave coaxially associated therewith and movable only a portion of a revolution between limits of focus adjustment, said sheaves being of equal effective diameters and said adjusting means effecting identical focus settings of said assemblies upon rotation of said sheaves to the same relative extent, and a tape of flexible, unstretchable material extending horizontally between said lens barrel assemblies tangentially to the upper surfaces of said rotatable sheaves, said tape extending in contacting relation about said sheaves beyond the points of tangency to a considerable extent and the ends thereof being fastened to the respective sheaves, the points of attachment of said ends to said sheaves being in such relative position that neither end of the tape may pass beyond the point of tangency when said sheaves are rotated to either limit of adjustment, and a portion of the horizontal reach of said tape between said lens barrel assemblies being exposed to view and having focus indicia thereon.

12. A stereoscopic camera comprising a horizontally spaced pair of lens barrel assemblies, each of said lens barrel assemblies including focus adjusting means comprising a first rotatable sheave coaxially associated therewith and movable only a portion of a revolution between limits of focus adjustment, said first sheaves being of equal effective diameter and said focus adjusting means effecting identical focus settings of said assemblies upon rotation of said first sheaves to the same relative extent, each of said lens barrel assemblies also including adjustable diaphragm mechanism comprising a second rotatable sheave coaxially associated therewith and movable only a portion of a revolution between limits of diaphragm adjustment, said second sheaves being of equal effective diameters and said diaphragm mechanism effecting identical diaphragm settings of said assemblies upon rotation of said second sheaves to the same relative extent, a tape of flexible, unstretchable material extending horizontally between said lens barrel assemblies tangentially to the upper surfaces of said first sheaves, said tape extending in contacting relation about said first sheaves beyond the points of tangency to a considerable extent and the ends thereof being fastened to the respective sheaves, the points of attachment of said ends to said sheaves being in such relative position that neither end of the tape may pass beyond the point of tangency when said sheaves are rotated to either limit of adjustment, a portion of the horizontal reach of said tape between said lens barrel assemblies being normally exposed to view and having focus indicia thereon to provide a focus scale, an endless band of flexible, unstretchable material passing around and fastened to said second sheaves so as to provide horizontal upper and lower reaches, the points of attachment of said band to said second sheaves being in such relative position that neither attached portion of the band may pass beyond the points of tangency when said second sheaves are rotated to either limit of adjustment, a first mask fastened to the upper reach of said endless band and movable thereby across the exposed portion of said tape upon adjustment of said diaphragm mechanisms, a second mask attached to the lower reach of said endless band and movable thereby across tthe exposed portion of said tape simultaneously with said first mask and to the same extent but in the opposite direction, said masks being movable from one relative limit position at which a large portion of said focus scale is exposed between said masks to another relative limit position at which said focus scale is completely obscured.

13. The construction set forth in claim 12 wherein at least one of said masks is provided with stop indicia, and said camera is provided with a stop indicator past which said stop indicia move as said diaphragm mechanisms are adjusted and a focus indicator past which said focus indicia move as said focus adjusting means are adjusted.

14. A camera comprising a lens barrel assembly including focus adjusting means comprising a rotatable sheave coaxially associated therewith, a second rotatable sheave horizontally spaced from said first sheave, a tape of flexible, unstretchable material extending horizontally between said sheaves tangentially to the upper surfaces thereof, the ends of said tape being partially wrapped about said sheaves in opposite directions and fastened thereto, said first rotatable sheave being movable between limits of less than one revolution of the sheave and the ends of said tape being so located that neither end may be brought to the point of tangency of said tape upon adjustment of said first sheave to its limits of movement a portion of the horizontal reach of said tape between said sheaves being exposed to view and having focus indicia thereon, and an indicator on said camera past which said indicia move as said sheaves are rotated.

GORDON N. SMITH.

REFERENCES CITED

The following references are of record in the file of this patent:

UNITED STATES PATENTS

| Number | Name | Date |
|---|---|---|
| 2,297,634 | Pritschow | Sept. 29, 1942 |
| 2,342,819 | Priesemann | Feb. 29, 1944 |
| 2,342,876 | McWilliams | Feb. 29, 1944 |
| 2,350,009 | Babcock | May 30, 1944 |

FOREIGN PATENTS

| Number | Country | Date |
|---|---|---|
| 291,771 | Great Britain | June 8, 1928 |